Patented June 30, 1931

1,812,274

UNITED STATES PATENT OFFICE

JOHN THOMAS, OF CARLISLE, ENGLAND, ASSIGNOR TO SCOTTISH DYES, LIMITED, OF CARLISLE, ENGLAND

PROCESS OF PREPARING 2-CHLOR-ANTHRAQUINONE

No Drawing. Application filed June 6, 1925, Serial No. 35,482, and in Great Britain September 8, 1924.

This invention relates to the manufacture of intermediates for dyestuffs and more specifically to the preparation of 2-chlor-anthraquinone.

One of the usual methods of preparing 2-chlor-anthraquinone is to treat para-chlor-benzoyl-benzoic acid with weak oleum at an elevated temperature and after the ring formation is complete the resulting solution of 2-chlor-anthraquinone is drowned in water and the chlor-anthraquinone filtered off and washed.

This method is wasteful in so far as considerable qualities of sulphuric acid are lost.

The object of the present invention is to provide a process free of this disadvantage.

To that end I have made experiments and have discovered two facts on the basis of which I have arrived at my invention.

According to the first I have found that 2-chlor-anthraquinone is only soluble to a slight extent in sulphuric acid of concentration about 85 to 90 per cent. by weight.

As to the second I have found that if a solution of para-chlor-benzoyl-benzoic acid in about 90 per cent. sulphuric acid is heated to a high temperature, for example of the order of 170° C., ring closing takes place. Thus, by the use of sulphuric acid of a suitable concentration and temperature in place of oleum I can obtain 2-chlor-anthraquinone by the simple process of crystallization from the liquor resulting in the treatment of para-chlor-benzoyl-benzoic acid with the aforesaid sulphuric acid on cooling the melt.

My invention consists in a process for the preparation of 2-chlor-anthraquinone from para-chlor-benzoyl-benzoic acid which comprises the treatment of the latter body with sulphuric acid of about 90 per cent. concentration at a temperature of about 170° C. followed by subsequent cooling of the melt and separation of the 2-chlor-anthraquinone by crystallization.

The invention also consists in a process as described in the preceding paragraph in which the acid filtrates are revivified by the addition of an appropriate quantity of oleum or sulphur trioxide and subsequently used for the preparation of 2-chlor-anthraquinone by the treatment of a further quantity of para-chlor-benzoyl-benzoic acid.

The invention also consists in the method of preparing crystallized 2-chlor-anthraquinone hereinafter described and the product thus produced.

All parts referred to in this specification are parts by weight.

*Example 1*

According to this example 100 parts of para-chlor-benzoyl-benzoic acid are dissolved in 1,000 parts of 90% sulphuric acid. The mixture is well stirred and heated to about 170° C. It is kept at this temperature for about one hour and then allowed to cool whereupon the 2-chlor-anthraquinone crystallizes out. The 2-chlor-anthraquinone crystals may be filtered off from the sulphuric acid and then washed free from acid with water and dried.

The resulting product melts at 206 to 208° C.

*Example 2*

The acid filtrates of a process of the character of Example 1 may be kept and after the addition of oleum used in a subsequent concentration. As an example of this use 850 parts of the filtrate from Example 1 containing as shown by test, say, about 86 per cent. sulphuric acid may be mixed with 150 parts of 65 per cent. oleum and 100 parts of para-chlor-benzoyl-benzoic acid added to this mixture. The process may then be repeated as in the example first given.

*General*

The acid filtrates may be used repeatedly before the accumulation of impurities renders them unsuitable for such use.

The general reaction proceeds very smoothly with almost a complete absence of the formation of by-products so that the 2-chlor-anthraquinone can be filtered off and the acid filtrates used for a number of operations after revivifying with oleum or sulphur trioxide. As a result, in a series of operations for the conversion of para-chlor-benzoylbenzoic acid to 2-chlor-anthraquinone, the consumption of sulphuric acid is very small.

Having now described my invention, what I claim as new and desire to secure by Letters Patent is:—

1. A process for the preparation of 2-chlor-anthraquinone from para-chlor-benzoyl-benzoic acid which comprises the treatment of the latter body with sulphuric acid of about 90 per cent. concentration at a temperature of about 170° C. followed by subsequent cooling of the melt and separation of the 2-chlor-anthraquinone.

2. A process for the preparation of 2-chlor-anthraquinone from para-chlor-benzoyl-benzoic acid which consists in dissolving 100 parts of para-chlor-benzoyl-benzoic acid in about 1,000 parts of sulphuric acid of about 90 per cent. strength, stirring the mixture, heating it to about 170° C. and maintaining it at this temperature for about an hour, after which it is permitted to cool and the 2-chlor-anthraquinone which crystallizes out is separated from the solution.

3. In the process of preparing 2-chlor-anthraquinone, the step which comprises treating para-chlor-benzoyl-benzoic acid with 85–90% sulphuric acid at an elevated temperature until the formation of a 2-chlor-anthraquinone is substantially complete.

4. In the process of preparing 2-chlor-anthraquinone, the step which comprises treating para-chlor-benzoyl-benzoic acid with 85–90% sulphuric acid at an elevated temperature until the formation of a 2-chlor-anthraquinone is substantially complete, thereafter allowing the 2-chlor-anthraquinone to crystallize and separating the 2-chlor-anthraquinone from the liquid menstruum.

In testimony whereof I have signed my name to this specification.

JOHN THOMAS.